3,132,992
RODENT REPELLENT POLYETHYLENE
Ellsworth E. Kimmel, Pittsburgh, Pa., assignor to Koppers Company, Inc., a corporation of Delaware
No Drawing. Filed May 19, 1960, Ser. No. 39,061
1 Claim. (Cl. 167—46)

This invention relates to polyethylene, and more particularly, to polyethylene having increased resistance to penetration by rodents and other depredative animals.

Polyethylene has, for a long time, been used as a material for packaging and containing goods because such material is light in weight, has excellent clarity and strength, and provides ease in handling. The use of polyethylene has been restricted, however, because polyethylene normally does not resist attack by rodent. Polyethylene has been used heretofore, for example, as a container for silage on farms. Silage is made by storing of a green chopped and unchopped forage for a period of about four to seven months whereby fermenation will occur. Exposure of silage to air will result in spoilage of the forage. The use of towers or silos has been the common method of occluding air from the forage. The use of horizontal trenches, bunkers and stacks for production of silage has increased rapidly during the past few years. Horizontal silos, however, have a large area of exposed surface as compared to tower silos. The increase in surface area requires an effective barrier to prevent excessive losses of the silage. Polyethylene film is advantageous for such a barrier. However, polyethylene is susceptible to penetration by rodents and other depredative animals and spoilage of the silage results if a penetration of the polyethylene is made.

The storage of animal and poultry feeds in polyethylene containers has not been feasible heretofore because of the high incidence of mice and rats in farm areas. Although cotton and burlap have been used for farm storage and do offer some resistance to rodent penetration, the lack of a good solution to the problem of rodent penetration, has necessitated maintaining a minimum inventory of feed by the farmer to minimize damage by rodents.

Attempts to make a plastic film rodent repellent heretofore, have not met with commercial success because the high concentration of additives used have resulted in excessively high costs.

It has now been discovered that polyethylene containing 2% by weight of a compound selected from the group consisting of trinitrobenzene aniline complex and tributyl tin chloride, is an effective rodent repellent. Surprisingly, articles made from polyethylene containing, for example, trinitrobenzene aniline complex is concentration as low as 2%, show a reduction in penetration by mice and other foraging animals, as great as 85%, when compared with similar articles of untreated polyethylene.

The amount of compound selected from the group consisting of trinitrobenzene aniline complex and tributyl tin chloride additive contained in the polyethylene, can be as low as 1% by weight of the film but advantageously is 2%. If less than 1% of the additive is contained in the polyethylene, the effectiveness of the products to resist penetration by rodents, is lowered; and if more than 2% of the additive is contained in the polyethylene, the amount of protection which the products afford against rodents, does not materially increase. In addition, if large amounts of the additive are used, the economical advantage of the use of the treated film as a rodent-repellent material, is nullified by the cost of the raw materials. The ability of a polyethylene containing between 1% and 2% by weight of the additive to effectively repel penetration by rodents, is remarkable, in view of the fact that rats and mice have the ability to penetrate barriers containing any one of a whole group of compounds that should be highly noxious and/or highly toxic to the rats and mice. Rats and mice have been known to discard immediately material removed from a barrier during the penetration thereof without ingesting any of it and apparently without tasting any of the obnoxious material that the barrier may contain.

The additives of this invention are available in commercial quantities. Trinitrobenzene aniline complex is a solid orange-red crystal material having a melting point between 122° C. and 126° C. Tributyl tin chloride is a water insoluble liquid which is thermally stable at 300° C.

Any of the commercially available polyethylenes may be used in the practice of this invention. The particular properties of the polyethylene to be used will depend upon the equipment to be used in producing articles from the polyethylene and also the specifications demanded by the ultimate consumer.

The novel rodent-repellent polyethylene of this invention may be made by blending the additive with polyethylene in any of the conventional manners of blending solid materials with polyethylene, for example, pellets of polyethylene may be placed in a mixer, such as a Banbury mixer, along with the additives and mixed, and then the mixture extruded in a conventional manner. The blend of additive and polyethylene may be extruded directly as sheets or film, or may be extruded as a rod which is chopped into pellets for use by fabricators of polyethylene articles. Alternatively, polyethylene pellets may be placed in a Bolling two-roll mill and compounded into sheet form, whereupon additive is added to the compounded sheet until the desired concentration is reached. The additive containing polyethylene sheet may then be removed from the rolls and used as a rodent-repellent sheet material. The polyethylene of this invention may be made into numerous useful articles by conventional processes of injection molding or extrusion. A film of polyethylene containing 2% by weight of the additive may be made into a package, for example, by heat-sealing the edges of the polyethylene.

A rodent-repellent material can be made by laminating by conventional extrusion laminating methods, the polyethylene film of this invention to cotton, burlap, paper, or the like. The thus-laminated structure can be made into individual packages for storage, or a protective tarpaulin can be made to cover or surround other packages which are subject to rodent attack during storage in warehouses, depots, or outdoor storage areas.

The formation of articles from the novel polyethylene of this invention, is not limited to extrusion operations, but will include conventional blow-molding and injecting molding operations. For example, the additive containing polyethylene may be injection molded into individual rigid protective containers, such as garbage cans, that are susceptible to rodent penetration.

The following examples further illustrate this invention:

EXAMPLE I

Ten pounds of low-density extrusion grade polyethylene sold by Koppers Company, Inc., under the trade name of "Dylan," and .02 pound of trinitrobenzene aniline complex, were thoroughly mixed in a Banbury mixer. This mixture was then extruded in a one inch extruder with a 12:1 barrel length to barrel diameter ratio and a die diameter of two inches, with a .020″ gap opening and at a die temperature of 340° F. to produce a film having a thickness of 4–6 mils. This film contained throughout 2% by weight of trinitrobenzene aniline complex. Similarly, 10 pounds of the polyethylene treated with .02 pound of tributyl tin chloride were also prepared. A control 10 pounds of the polyethylene without an additive were prepared in a like manner.

The repellent-treated and untreated film were made into small envelopes and filled with a quantity of oats and ground fox chow sufficient to sustain a conditioned test animal 24 hours. The envelopes were then sealed and tested by exposing a single-treated and untreated bag to an individually caged house mouse for a 24 hour period. The results of a series of tests made, using these test animals, are shown in the following table:

*Table I*

| Polyethylene | Rodent | Number of Animals | Number of Bags Penetrated | | | Total Number Bags Penetrated | Damage Reduction, Percent |
| --- | --- | --- | --- | --- | --- | --- | --- |
| | | | Treated | Untreated | Both | | |
| 2% Trinitrobenzene Aniline Complex vs. Untreated Polyethylene. | House Mice | 51 | 3 | 47 | 1 | 52 | 85 |
| Do | do | 51 | 1 | 43 | 7 | 58 | 72 |
| 2% Tributyl Tin Chloride vs. Untreated Polyethylene. | do | 52 | 4 | 40 | 8 | 60 | 60 |
| Do | do | 52 | 0 | 43 | 9 | 61 | 70 |

The procedure as hereinabove-described was followed except that Norway rats were used as the test animals. The amount of food, however, was insufficient to sustain a test rat for a 24 hour period. These rats are known to be among the most aggressive and voracious of all rodents. Therefore, any reduction in damage to materials susceptible to rodent attack, is a very material improvement, and particularly so, when this damage is shown to be reduced by tests made under ideal conditions, where attack of the test specimens by the Norway rat would normally be inevitable. The results of this series of tests are described in Table II:

*Table II*

| Polyethylene | Rodent | Number of Animals | Number of Bags Penetrated | | | Total Number Bags Penetrated | Damage Reduction, Percent |
| --- | --- | --- | --- | --- | --- | --- | --- |
| | | | Treated | Untreated | Both | | |
| 2% Trinitrobenzene Aniline Complex vs. Untreated Polyethylene. | Norway Rats | 42 | 9 | 21 | 12 | 54 | 22 |
| 2% Tributyl Tin Chloride vs. Untreated Polyethylene. | do | 20 | 2 | 11 | 7 | 27 | 33 |

In the above tables, the damage reduction R, was calculated by the formula:

$$R = \frac{V - T}{N}$$

where V represents the number of times untreated bags only were penetrated in a cage, T represents the number of times treated bags only were penetrated in a cage, and N equals the total number of bags penetrated.

As shown in the above table, polyethylene films containing 2% trinitrobenzene aniline complex or 2% tin chloride, are highly effective in preventing penetration by rodents. These tests are significant because the laboratory tests represent optimum conditions for rodent attacks. The reduction in rodent damage obtained in laboratory tests, has been found to be greatly improved when tested materials are placed under field tests.

The excellent rodent repellent properties of the polyethylene of this invention are further complemented by the fact that the tensile strength properties of the polyethylene having the additives incorporated therein have in no way been changed or deleteriously affected when compared with a like polyethylene containing no rodent repellent additives. Table III below shows comparative data obtained from tests conducted upon additive-treated and untreated polyethylene film:

*Table III*
TENSILE STRENGTHS OF POLYETHYLENE FILM

| Sample | Tensile Strength at Yield, p.s.i. | Tensile Strength at Break, p.s.i. |
| --- | --- | --- |
| Polyethylene (no additives) | 1,070 | 1,270 |
| Polyethylene +2% trinitrobenzene aniline complex | 1,170 | 1,260 |
| Polyethylene +2% tributyl tin chloride | 1,100 | 1,280 |

The 2% concentration of additive in polyethylene, will impart to the polyethylene a pale color, which color is derived from the additive. For example, when a blend of polyethylene and trinitrobenzene aniline is extruded as a film, the film will have a reddish or pink tint. The color of the polyethylene will provide a distinctive characteristic to the polyethylene, whereby it will be easily recognizable as a rodent repellent material.

For outdoor applications, the preferred compositions include the use of carbon black dispersed in the polyethylene to prevent the loss of strength through ultraviolet light exposure.

The foregoing has presented a novel economical rodent repellent polyethylene which can be employed successfully as a protective cover in rural and agricultural areas where stored materials are vulnerable to rodent attack. The treated polyethylene can be used as separate packaging material, or as protective tarp under and around other packaged materials. An especially strong, durable, and repellent package or tarpaulin, can be made from a film laminated cotton or burlap material. This film can be applied to the inner or outer walls of storage buildings to act as a protective coating against entry of rodents into the buildings. Small cracks, openings, and window areas in buildings can be quickly sealed to provide a permanent or temporary deterrent to entry by marauding rodents.

What is claimed is:

Polyethylene which is capable of protecting goods from attack and destruction by rodents, which comprises: polyethylene containing substantially uniformly distributed throughout from 1% to 2% by weight of tributyl tin chloride.

References Cited in the file of this patent

FOREIGN PATENTS 525,076   Canada _____ May 15, 1956

OTHER REFERENCES

Welch: Journal of Agricultural and Food Chemistry, vol. 2, 1954, pages 142–149.